US011931308B1

(12) United States Patent
Liu et al.

(10) Patent No.: US 11,931,308 B1
(45) Date of Patent: Mar. 19, 2024

(54) METHOD AND SYSTEM FOR PROVIDING ADULT ENTERTAINMENT

(71) Applicant: HYTTO PTE. LTD., Singapore (SG)

(72) Inventors: Dan Liu, Guangzhou (CN); Jilin Qiu, Guangzhou (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/350,923

(22) Filed: Jul. 12, 2023

(51) Int. Cl.
*A61H 19/00* (2006.01)
*A61F 5/41* (2006.01)
*A61H 23/02* (2006.01)
*G06Q 20/22* (2012.01)
*H04L 12/18* (2006.01)

(52) U.S. Cl.
CPC ............ *A61H 19/30* (2013.01); *G06Q 20/29* (2013.01); *H04L 12/1813* (2013.01); *A61H 2201/5005* (2013.01); *A61H 2201/5012* (2013.01); *A61H 2201/502* (2013.01); *A61H 2201/5041* (2013.01); *A61H 2201/5048* (2013.01)

(58) Field of Classification Search
CPC ............ A61H 19/30; A61H 2201/5005; A61H 2201/5012; A61H 2201/502; A61H 2201/5041; A61H 2201/5048; G06Q 20/29; H04L 12/1813
See application file for complete search history.

(56) References Cited

U.S. PATENT DOCUMENTS

| | | | |
|---|---|---|---|
| 10,945,914 B1 * | 3/2021 | Liu | G06Q 20/123 |
| 11,134,041 B1 | 9/2021 | He | |
| 2012/0179077 A1 * | 7/2012 | Tuck | A61H 19/44 601/46 |
| 2012/0259171 A1 * | 10/2012 | Shmakov | A63F 13/71 600/38 |
| 2013/0261385 A1 * | 10/2013 | Zipper | A61H 23/0263 600/38 |
| 2014/0371525 A1 * | 12/2014 | Fang | A61H 19/00 600/38 |
| 2015/0174000 A1 * | 6/2015 | Barasch | A61H 19/30 600/38 |
| 2015/0328082 A1 * | 11/2015 | Jiang | A61H 23/02 600/38 |
| 2016/0213556 A1 * | 7/2016 | Cai | A61H 19/34 |

(Continued)

FOREIGN PATENT DOCUMENTS

WO    WO-2023131950 A1 *    7/2023

*Primary Examiner* — Chico A Foxx
(74) *Attorney, Agent, or Firm* — Kanika Radhakrishnan; Evergreen Valley Law Group

(57) ABSTRACT

Embodiments of the present disclosure disclose a method for providing adult entertainment. The method includes pre-defining, by a controller, one or more preset parameters corresponding to at least one predefined action of an adult toy. The method further includes recording, by the controller, a time-based metric for an input signal received from a user device. Furthermore, the method includes determining, by the controller, if the time-based metric matches one of the one or more preset parameters. Moreover, the method includes actuating, by the controller, on a successful match between the time-based metric and the one of the one or more preset parameters, the adult toy to perform a pre-defined action of the at least one predefined action, corresponding to the matched preset parameter to sexually stimulate a user of the adult toy.

20 Claims, 15 Drawing Sheets

(56) References Cited

U.S. PATENT DOCUMENTS

| | | | |
|---|---|---|---|
| 2017/0366858 A1* | 12/2017 | Olivares, II | G11B 27/13 |
| 2020/0116139 A1* | 4/2020 | Murison | A61H 9/0057 |
| 2020/0276504 A1* | 9/2020 | Liu | A61H 19/32 |
| 2022/0139168 A1 | 5/2022 | He et al. | |
| 2022/0139169 A1 | 5/2022 | He et al. | |

* cited by examiner

METHOD AND SYSTEM FOR PROVIDING ADULT ENTERTAINMENT

TECHNICAL FIELD

The present disclosure relates to online adult entertainment and more particularly relates to a method for providing adult entertainment a system thereof.

BACKGROUND

Sexual stimulation enhances and maintains sexual arousal, leading to orgasm. Sexual stimulation involves the stimulation of genitals, other body parts, senses, mental stimulation, etc. Sufficient stimulation of a male body part (e.g., penis) or a female body part (e.g., clitoris) usually results in an orgasm. The sexual stimulator can be used for creating sexual pleasure to various body parts such as the vulva, clitoris, vagina, and the like various body parts such as the vulva, clitoris, vagina, and the like. The adult toy may also have a vibration feature for providing sexual stimulation.

In conventional adult toys, the intensity of the sexual stimulation is manually controlled by a user. For example, the vibrator to be used by the female may be configured with a switch adapted to alter the operating vibration frequency of the vibrator. However, for such conventional self-operated adult toys, the user may not always feel the same level of stimulation experience while using the adult toy. Additionally, the arousal of the user may change periodically based on one or more factors like mood, environment, etc., and therefore, the sexual stimulation produced using the adult toy through conventional self-operating mode and its preset parameters may not satisfy the user's desire while using the adult toy.

Sexual stimulation can be achieved by an individual or a group of individuals (irrespective of gender) by using adult toys. Adult toys can have a vibration feature for providing sexual stimulation. In conventional adult toys, a degree or intensity of sexual stimulation may be manually controlled. However, the user may not always feel the same level of stimulation at every instance while using the adult toy.

At present time, people are using social media and networks such as wireless interference, Local Area Networks (LAN), Wide Area Networks (WAN) (e.g., broadcast online streaming), etc. for configuring adult toys. These technologies provide a level of customization to the needs of the user or the group of users to experience sexual stimulation without direct physical contact. However, in such scenarios as well users have rather minimal control over features such as time duration, intensity, level of interaction, etc., and very little option for customization.

Therefore, there exists a need to develop a method and a system for providing adult entertainment in a manner that does not suffer from the aforementioned deficiencies.

SUMMARY

Various embodiments of the present disclosure disclose a method and system for providing adult entertainment.

According to an aspect of the present invention, there is provided a method for providing adult entertainment. The method includes predefining, by a controller, one or more preset parameters corresponding to at least one predefined action of an adult toy. Further, the method includes recording, by the controller, a time-based metric for an input signal received from a user device, The method further includes determining, by the controller, if the time-based metric matches one of the one or more preset parameters. Also, the method includes actuating, by the controller, on a successful match between the recorded time-based metric and the one of the predefined one or more preset parameters, the adult toy to perform a pre-defined action of the at least one predefined action, corresponding to the matched preset parameter to sexually stimulate a user of the adult toy.

According to another aspect of the present invention, there is provided a system for providing adult entertainment. The system includes a controller. The controller includes a memory unit including machine-readable instructions and a processor operably connected to the memory unit. The processor is configured to execute the machine-readable instructions, the machine-readable instructions when executed enable the controller to predefine one or more preset parameters corresponding to at least one predefined action of an adult toy, record a time-based metric for an input signal received from a user device, determine if the time-based metric matches one of the one or more preset parameters, and actuate, on a successful match between the recorded time-based metric and the one of the predefined one or more preset parameters, the adult toy to perform a pre-defined action of the at least one predefined action, corresponding to the matched preset parameter to sexually stimulate a user of the adult toy.

According to another aspect of the present invention, there is provided a non-transitory computer-readable storage medium. The non-transitory computer-readable storage medium includes machine-readable instructions. The machine-readable instructions when executed by a processor of a controller enable the controller to predefine one or more preset parameters corresponding to at least one predefined action of an adult toy, record a time-based metric for an input signal received from a user device, determine if the time-based metric matches one of the one or more preset parameters, and actuate, on a successful match between the recorded time-based metric and the one of the predefined one or more preset parameters, the adult toy to perform a pre-defined action of the at least one predefined action, corresponding to the matched preset parameter to sexually stimulate a user of the adult toy.

In the context of the specification, the term "processor" refers to one or more microprocessors, a microcontroller, a general-purpose processor, a Field Programmable Gate Array (FPGA) or an Application Specific Integrated Circuit (ASIC), and the like.

In the context of the specification, a phrase including "memory unit", such as "device memory unit" or "server memory unit", refers to volatile storage memory, such as Static Random Access Memory (SRAM) and Dynamic Random Access Memory (DRAM) of types such as Asynchronous DRAM, Synchronous DRAM, Double Data Rate SDRAM, Rambus DRAM, and Cache DRAM, etc., In the context of the specification, a phrase including "storage unit", such as "device storage unit" refers to a non-volatile storage device including non-volatile memory such as EPROM, EEPROM, flash memory, or the like.

In the context of the specification, a phrase including "communication interface", such as "server communication interface" or "device communication interface" refers to a device or a module enabling direct connectivity via wires and connectors such as USB, HDMI, VGA, or wireless connectivity such as Bluetooth or Wi-Fi or Local Area Network (LAN) or Wide Area Network (WAN) implemented through TCP/IP, IEEE 802.x, GSM, CDMA, LTE, or other equivalent protocols.

BRIEF DESCRIPTION OF THE DRAWINGS

The following detailed description of illustrative embodiments is better understood when read in conjunction with the appended drawings. To illustrate the present disclosure, exemplary constructions of the disclosure are shown in the drawings. However, the present disclosure is not limited to a specific device, or a tool and instrumentalities disclosed herein. Moreover, those in the art will understand that the drawings are not to scale.

Figure 1:
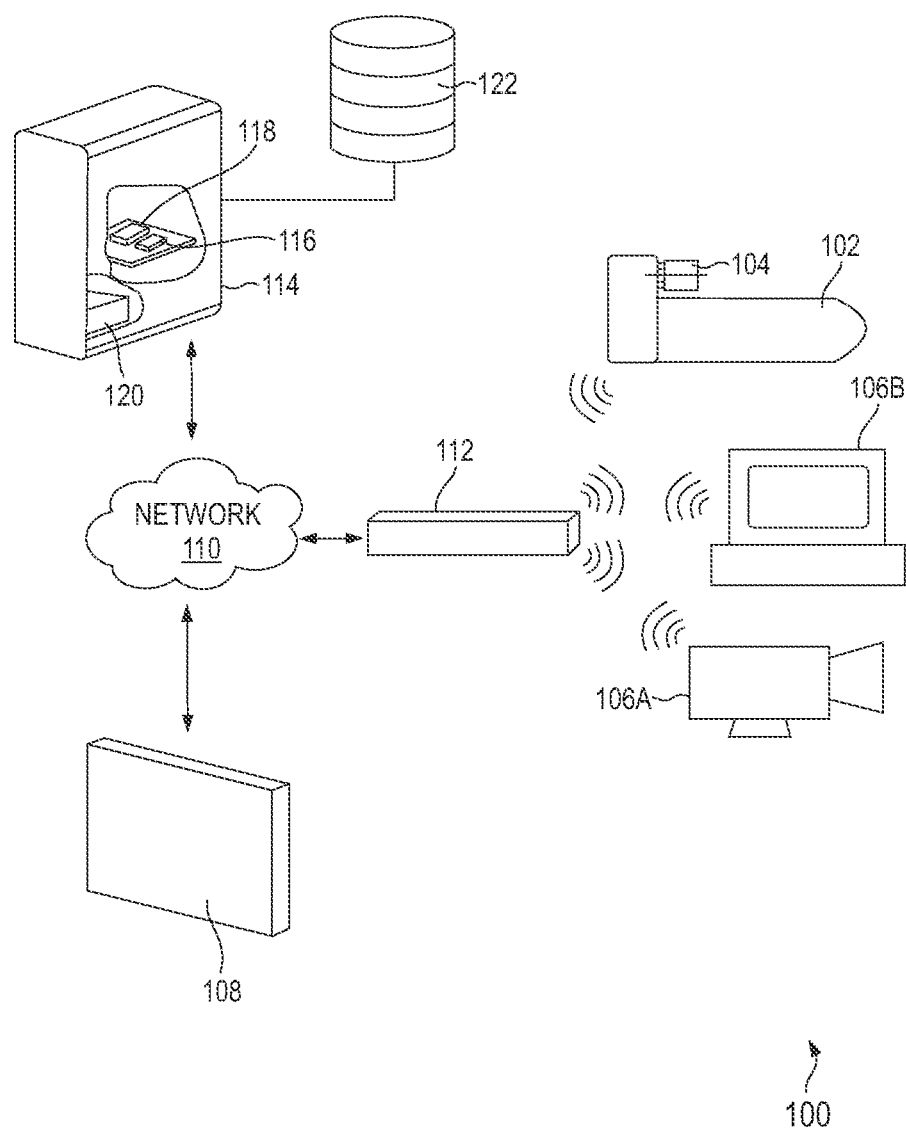
FIG. 1 illustrates an example representation of an environment related to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

In the context of the specification, the term "processor" refers to one or more microprocessors, a microcontroller, a general-purpose processor, a Field Programmable Gate Array (FPGA) or an Application Specific Integrated Circuit (ASIC), and the like.

In the context of the specification, a phrase including "memory unit", such as "device memory unit" or "server memory unit", refers to volatile storage memory, such as Static Random Access Memory (SRAM) and Dynamic Random Access Memory (DRAM) of types such as Asynchronous DRAM, Synchronous DRAM, Double Data Rate SDRAM, Rambus DRAM, and Cache DRAM, etc.

In the context of the specification, a phrase including "storage unit", such as "device storage unit" refers to a non-volatile storage device including non-volatile memory such as EPROM, EEPROM, flash memory, or the like.

In the context of the specification, a phrase including "communication interface", such as "server communication interface" or "device communication interface" refers to a device or a module enabling direct connectivity via wires and connectors such as USB, HDMI, VGA, or wireless connectivity such as Bluetooth or Wi-Fi or Local Area Network (LAN) or Wide Area Network (WAN) implemented through TCP/IP, IEEE 802.x, GSM, CDMA, LTE, or other equivalent protocols.

Overview

Various embodiments of the present disclosure provide a controller that enables a user device to interact with a remotely located adult toy. In that regard, to be able to interact with the adult toy an input signal from the user device would need to match several preset parameters for actions performed by the adult toy. The preset parameters, in several scenarios, may be embodied as time-based metrics such as instances of time at the beginning and the end of the input signal, duration of the input signal, an instance of time within the duration of the input signal, etc. The time instances may be maintained in Unix timestamps.

Alternatively, the controller may facilitate the interaction between the user device and the adult toy on the transfer of predefined amounts in the form of tokens from the user device to a second user device associated with the adult toy and located at the end of the adult toy. The controller may then set up communication between the user device and the second user device locally connected to the adult toy so that the user device can receive video streaming from the second user device. In such a scenario, the input signal is considered to correspond to a tipping operation. Further, the one or more preset parameters may be updated by values provided by the second user device. The controller may further facilitate visual indications to be provided on a display unit of the user device to indicate, for example, intensity of vibration of the adult toy. The visual indications may be embodied as a number on a face of a dice, a number of visible bars, etc.

In several alternate embodiments, to enhance an overall experience of the interaction between the user device and the adult toy, the controller may modify the Graphic User Interface (GUI) of the display unit of the user device to provide interactive content such as a target shooting game or a rhythm game. In target shooting games, the preset parameters may time instances within a time period of a cyclical event. For example, during the circular movement of one of the target or the shooting element, a time instance of the input signal may be matched with the time instances defined as preset parameters. In the case of the rhythm game, preset parameters may be preset beats in a section of music. The controller may then modify the GUI to display prompt elements which when stepped right using an input device would allow the user device to interact with the adult toy. In such a scenario, the stimulation intensity of the adult toy may be modified as per quantitative and qualitative attributes of the steps on the prompt elements. The controller may also trigger the adult toy to perform specific actions when satisfying a preset number of consecutive right steps on the prompt elements.

Various example embodiments of the present disclosure are described hereinafter with reference to FIG. 1 to FIG. 11.

FIG. 1 illustrates an example representation of an environment 100 related to at least some examples of the present disclosure. The environment 100 in general, although not bindingly, can be divided into three segments, a first segment depicting a user or a consumer end, a second segment depicting a content creator or provider end, and a third segment depicting a computer-implemented service integrating the content creator or the provider end with the user or the consumer end. In that regard, the content creator or provider end of the environment 100 includes an adult toy 102. The adult toy 102 may be configured in a variety of shapes and sizes, based on the type of user (e.g., boy, man, girl, woman, etc.). The adult toy 102 may provide pleasurable sexual stimulation through one or more functions of the adult toy 102 such as extension, expansion, contraction, vibration, temperature sensation, and the like. In an illustrated example, for the purpose of explanation, the adult toy 102 has been depicted as a vibrator. The adult toy 102 is made to vibrate by a vibration motor 104.

By controlling operating parameters such as rotations per minute (rpm) of the vibration motor 104, the user gets pleasurable sexual stimulation by contact with one or more body components such as a clitoris, a vagina, or other erogenous zones. It is envisaged that the operating parameters of the adult toy 102 can be remotely controlled by connecting with a network 110. It should be noted that the present disclosure is not limited to the vibration-based adult toy 102, other types of adult toys designed to provide sexual pleasure can also be used as per specific applications, without departing from the scope of the disclosure.

The content creator or provider end of the environment 100 has been illustrated to include a plurality of second user devices 106A, 106B. In the illustrated embodiment, the one of the second user devices 106a is a camera (that can be still or motion camera) and the other second user device 106b is a computing device. It should be noted that the plurality of a second user devices 106A, 106B used in the present disclosure is not limited to the camera and the computing unit, other types of devices such as an audio unit, phone, etc. capable of connecting with the network 110 may also be deployed for the purposed of the disclosure.

The Network 110 may include at least one of a Local Area Network (LAN), a Wide Area Network (WAN), a Light Fidelity (Li-Fi) network, a Metropolitan Area Network (MAN), a fiber-optic network, a coaxial cable network, Internet, a satellite network, an Infrared (IR) network, a Radio Frequency (RF) network, a virtual network, or any combination thereof. In the illustrated environment 100, the adult toy 102 and the plurality of second user devices 106A, 106B are connected to the network 110 through a wireless router 112. However, a person skilled in the art would appreciate that the adult toy 102 and the plurality of second user devices 106A, 106B can be connected to the network 110 through several different combinations of wired and wireless connections.

Furthermore, on the user or the consumer end of the environment 100, a user device 108 is connected to the network 110. The user device 108 is adapted to be operated by the user and may be embodied as one of several electronic communication devices such as, but not limited to, a smartphone, a laptop, a tablet device, a Personal Computer (PC), a Personal Digital Assistance (PDA), and wearable electronic communication devices such as smartwatches, virtual reality/augmented reality headsets, smart-glasses, etc. In the illustrated configuration, the user device 108 is a touch screen that includes a plurality of standalone applications capable of acting as client software for interacting with remote computing systems, through the network 110 for monitoring and control of the operation of the adult toy 102.

The computer-implemented service segment of the environment includes a server node 114 (hereinafter referred to as "controller node 114" or "controller 114"). The controller 114 includes a processor 116, a memory unit 118, and a communication interface 120. Depending upon the architecture of the network 110, the controller 114 may be a local server, a remote intranet server, a remote internet server, or a cloud-based server. Further connected to the controller 114 is a storage unit 122 that is configured to store several databases including login credentials and account details of consumers and content providers, network addresses of other devices in the environment 100, subscription-based associations between the consumers and the content providers, sample snippets of content for promotion of service, advertisement data, and other metadata received or generated during the provision of the computer implanted service to the consumers and the content providers alike.

Figure 2:
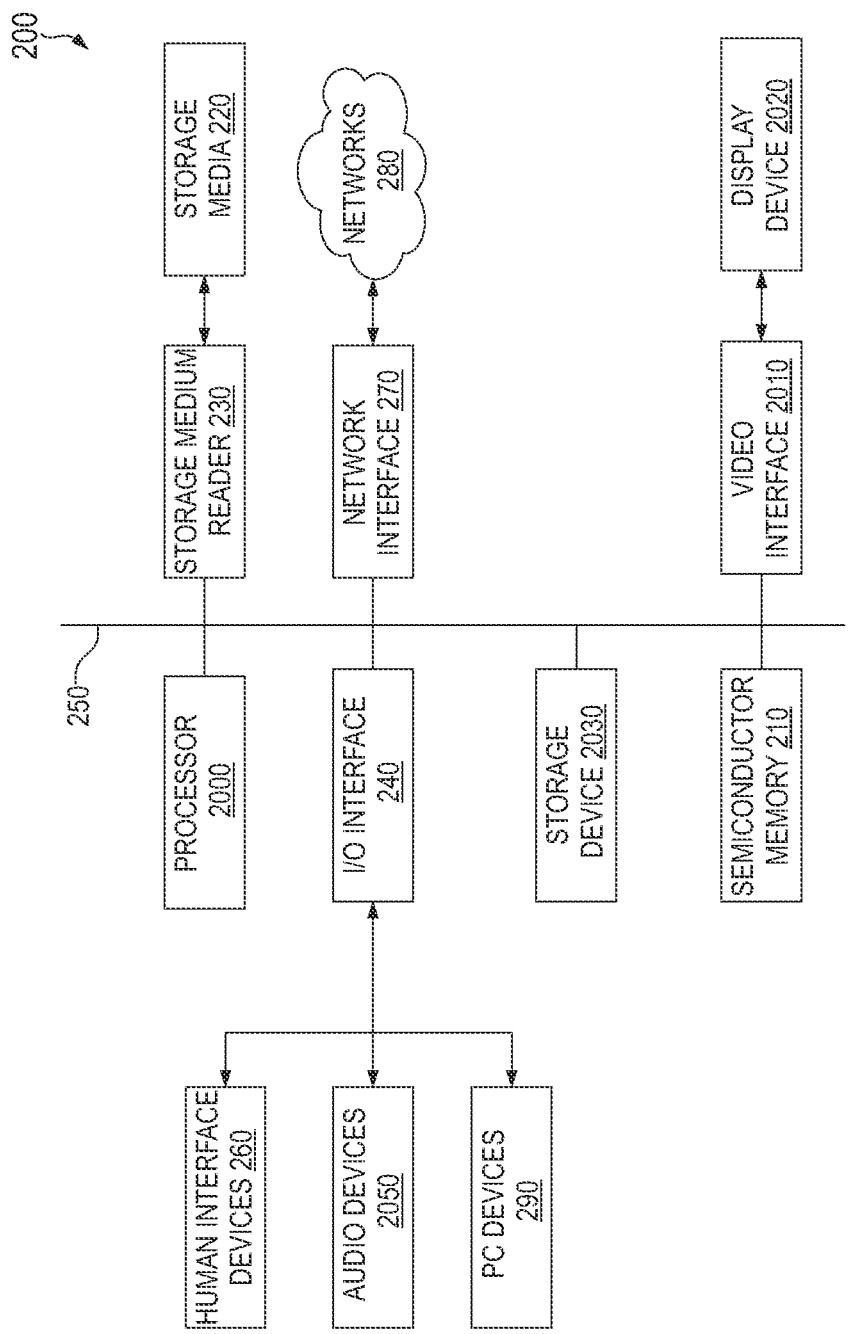
FIG. 2 illustrates a block diagram of a computing device, in accordance with an embodiment of the present disclosure.

FIG. 2 illustrates a block diagram of a computing device 200, in accordance with an embodiment of the present disclosure. In an embodiment, the computing device 200 takes the form of a server system (i.e., the controller 114)

described in FIG. 1. In this manner, the computing device 200 is adapted to include functionality for communication with the network 110, storage capability (such as the storage unit 122) for storing the data exchanged between the adult toy 102, the user device 108, the plurality of second user devices 106A, 106B.

However, it should be noted that the user device 108 or the second user device 106B may also be depicted as the computing device 200. In this manner, the computing device 200 may include differing technical integers, such as a display device 2020 electronically connected to a video interface 2010, one or more human interface devices 260, and the like. In other words, the technical integers of the computing device 200 shown in FIG. 2 are examples only, and variations, adaptations and the like may be made thereto within the purposive scope of the embodiments described herein and having regard for the particular application of the computing device 200.

In particular, the steps of methods for providing adult entertainment, as described in further detail below, may be implemented as computer program code instructions executable by the computing device 200. The computer program code instructions are executable by the computing device 200. The computer program code may be formed in the form of instruction libraries, such as dynamic link libraries (DLL), wherein each of the libraries performs one or more steps of the methods as would be discussed in the following discussion. Additionally, a subset of one or more libraries may perform graphical user interface tasks relating to the steps of the methods.

The computing device 200 further includes a semiconductor memory 210 including volatile memory such as Random Access Memory (RAM) or Read Only Memory (ROM). The semiconductor memory 210 may include either RAM or ROM or a combination of RAM and ROM. Furthermore, the computing device 200 includes a computer program code storage medium reader 230 for reading the computer program code instructions from computer program code storage media 220. The storage media 220 may be optical media such as CD-ROM disks, magnetic media such as floppy disks and tape cassettes, or flash media such as USB memory sticks.

Moreover, the computing device 200 includes an I/O interface 240 for communicating with the adult toy 102. The I/O interface 240 may offer both serial and parallel interface connectivity. For example, the I/O interface 240 may include a Small Computer System Interface (SCSI), and Universal Serial Bus (USB). The I/O interface 240 may also communicate with one or more human interface devices 260 such as keyboards, pointing devices, such as Recommended Standard 232 (RS-232) interface, for interfacing the computing device 200 with one or more personal computer (PC) devices 290. The I/O interface 240 may also include an audio interface for communicating audio signals to one or more audio devices 2050, such as a speaker or a buzzer.

The computing device 200 also includes a network interface 270 for communicating with one or more computer networks 280, such as the network 110. Computer program code instructions may be loaded into the storage device 2030 from the storage media 220 using the storage medium reader 230 or from the network 110 using the network interface 270. During the bootstrap phase, an operating system and one or more software applications are loaded from the storage device 2030 into the semiconductor memory 210. During the fetch-decode-execute cycle, a processor 2000 fetches computer program code instructions from the semiconductor memory 210, decodes the instructions into machine code, executes the instructions, and stores one or more intermediate results in the semiconductor memory 210.

In this manner, the instructions stored in the semiconductor memory 210, when retrieved and executed by the processor 2000, may configure the computing device 200 as a special-purpose machine that may perform the functions described above. The computing device 200 also includes a communication bus subsystem 250 for interconnecting the various devices described above. The communication bus subsystem 250 may offer parallel connectivity such as Industry Standard Architecture (ISA) conventional Peripheral Component Interconnect (PCI) and the like or serial connectivity such as PCI Express (PCIe), Serial Advanced Technology Attachment (Serial ATA), and the like.

Several embodiments of the present disclosure will now be elucidated taking the environment 100 and the computing device 200 as references. However, a person skilled in the art would appreciate that the embodiments of the disclosure discussed in the following discussion are not limited to the environment 100 and the computing device 200 also, rather they can be implemented in several alternate device environments and alternate computing architectures without departing from the scope of the invention.

Figure 3A:
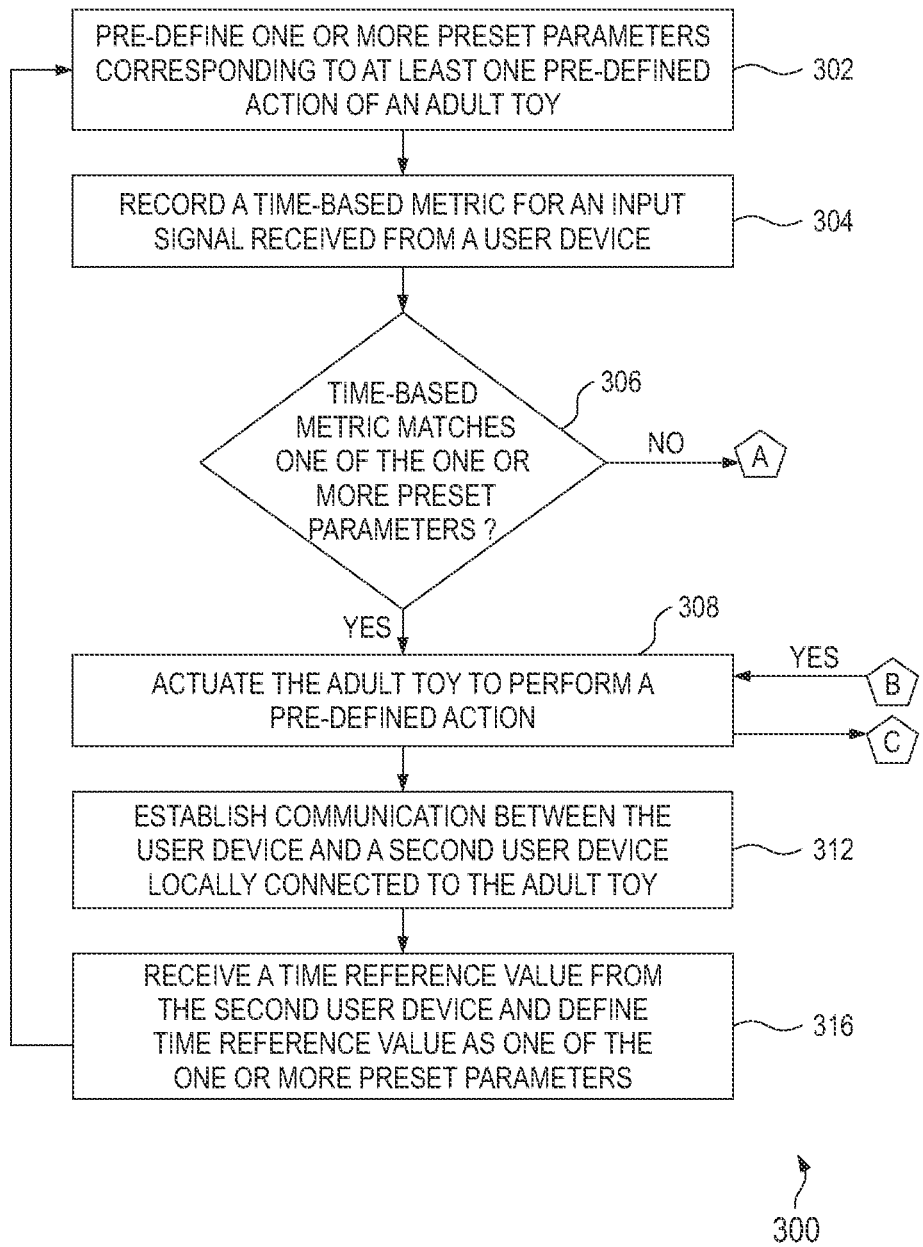
FIGS. 3A-3B illustrate a flow diagram illustrating a method for providing adult entertainment, in accordance with an embodiment of the present disclosure.
Figure 3B:
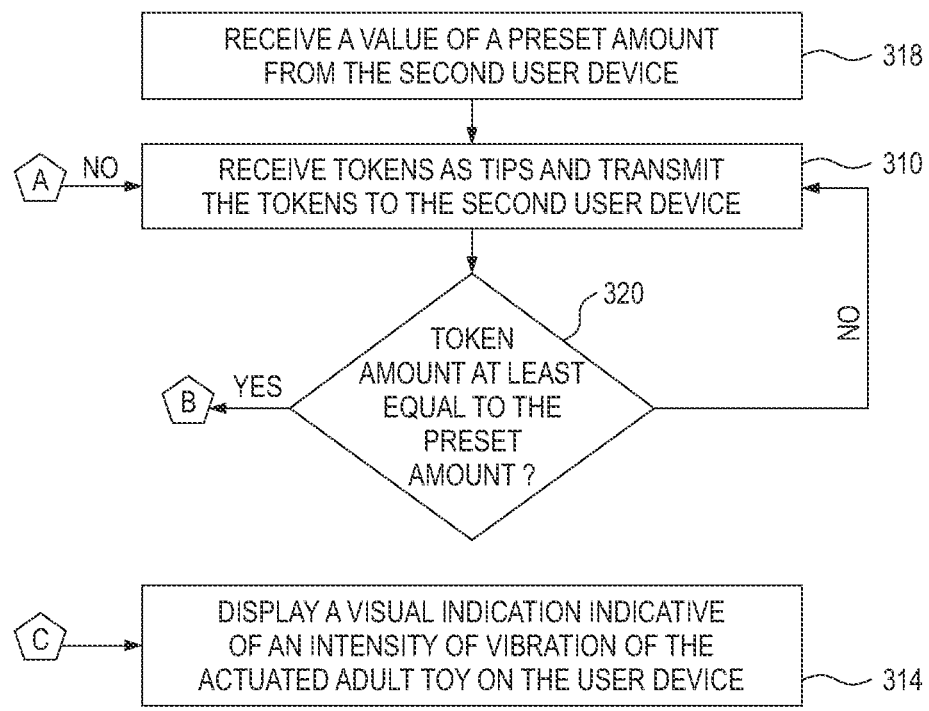

FIGS. 3A-3B illustrate a flow diagram illustrating a method 300 for providing adult entertainment, in accordance with an embodiment of the present disclosure. The method 300 begins at Step 302.

At Step 302, the controller 114 predefines one or more preset parameters corresponding to at least one predefined action of the adult toy 102. In an embodiment, the at least one of one or more preset parameters may include a time period or duration of an input signal (I) 401 (See FIGS. 4A, 4B, 4C), time instances of at the beginning and the end of the input signal (I) 401 (See FIGS. 4A, 4B, 4C), or any other time instances between the two terminal time instances.

Figure 4A:
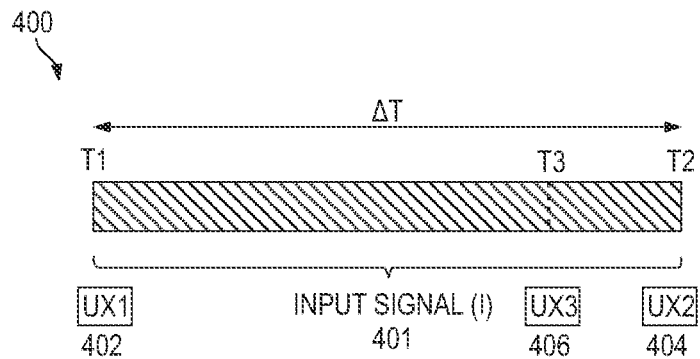
FIG. 4A illustrates an example representation of an input signal, in accordance with one embodiment of the present disclosure.
Figure 4B:
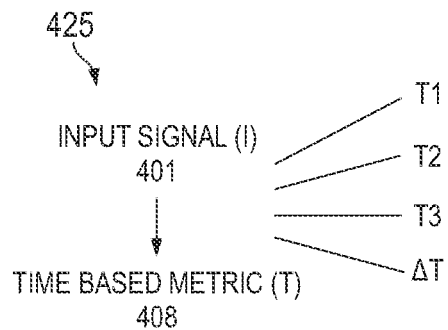
FIG. 4B illustrates example representations of several time-based metrics that can be derived from the input signal of FIG. 4A, in accordance with one embodiment of the present disclosure.

At Step 304, the controller 114 records a time-based metric for the input signal (I) 401 (See FIGS. 4A, 4B, 4C) received from the user device 108. The time-based metric is selected from a preset instance of time, a preset time instance during a preset period of time, and a duration of the preset period of time. FIG. 4A illustrates an example representation 400 of an input signal (I) 401, in accordance with one embodiment of the present disclosure. The input signal (I) 401 has a starting time instance (T1), an ending time instance (T2), a time interval (ΔT) between the starting (T1) and the ending (T2) time instances. Further, also depicted in FIG. 4A is a third time instance (T3) between the starting (T1) and the ending (T2) time instances. Each one of the starting (T1), the ending (T2), and the third (T3) time instances have respective Unix timestamps defined for them, viz. (Ux1 (402)), (Ux2 (404)), and (Ux3 (406)). In that regard, the time-based metric maybe a predefined field of a Unix timestamp of the input signal (I) 401. FIG. 4B illustrates example representations of several time-based metrics that can be derived from the input signal (I) 401 of FIG. 4A, in accordance with one embodiment of the present disclosure. The time-based metric maybe selected from preset instances of time at a start and an end of the input signal (I) 401 (for example, the starting (T1) and the ending (T2) time instances), a time interval (ΔT) of the input signal (I) 401, and the third time instance (T3).

Referring to FIGS. 3A-3B, at Step 306, the controller 114 determines if the time-based metric matches one of the one or more preset parameters. If the time-based metric matches the one of the one or more preset parameters, the method 300 proceeds to Step 308. Alternately, if the time-based metric is different from the one of the one or more preset parameters, the method 300 proceeds to Step 310.

At Step 308, the controller 114 actuates the adult toy 102 upon a successful match between the recorded time-based metric and the one of the predefined one or more preset parameters. In that manner, the adult toy 102 is actuated to perform a pre-defined action of the at least one predefined action, corresponding to the matched preset parameter to sexually stimulate a user of the adult toy. For example, the vibration motor 104 of the adult toy 102 may be remotely controlled by the controller 114 to increase or decrease the rotational speed of the vibration motor 104, operate the vibration motor 104 in a pulsed or a continuous mode, or increase or decrease frequencies of the pulsations.

Figure 4C:
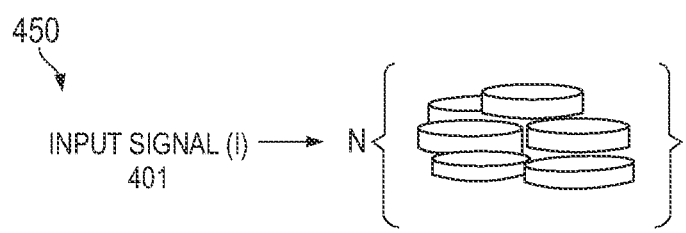
FIG. 4C illustrates another example representation of the input signal defined by a metric concerning a number of items in the input signal, in accordance with another embodiment of the present disclosure.

Alternately, at Step 310, the controller 114 receives tokens as tips from the user device 108. Further, the controller 114 transmits the tokens to the second user device 106B. The transmission of the tokens from the user device 108 to the second user device 106B is referred to as a tipping operation. FIG. 4C illustrates another example representation of the input signal (I) 401 defined by a metric concerning a number of items in the input signal (I) 401, in accordance with another embodiment of the present disclosure. The items in this case are tokens received from the user device 108.

Referring to FIGS. 3A-3B, in that regard, Step 318 precedes Step 310. At Step 318, the controller 114 receives a value of a preset amount from the second user device 106B. The preset amount maybe indicative of the minimum amount desired by the content provider to provide the adult entertainment to the consumer. At Step 320, the controller 114 determines if the amount (being proportional to the number of tokens) transferred during the tipping operation is at least equal to the preset amount defined through the second user device 106B. The input signal (I) 401 in such a scenario is received by the controller 114 only when the amount transferred during the tipping operation is at least equal to the preset amount. In several embodiments of the invention, the controller 114 deducts a portion equal to at least the preset value from the amount transferred from the user device 108 to the second user device 106B. The deducted portion that is equal to the preset amount from the amount being transferred is returned by the controller 114 to the user device 108.

Further, at Step 312, the controller 114 establishes communication between the user device 108 and the second user device 106B. Since the second user device 106B is locally connected to the adult toy 102 through the network router 112, the user device 108 is configured to receive video streaming from the second user device 106B. In that regard, the input signal (I) 401 corresponds to the tipping operation sent from the user device 108 to the second user device 106B.

Figure 5:
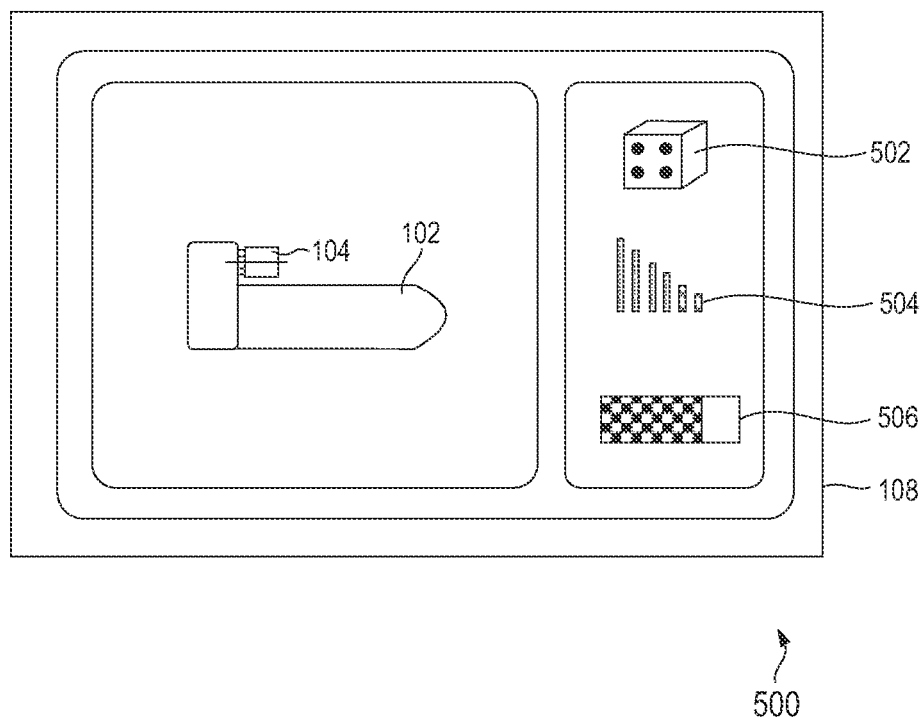
FIG. 5 illustrates an example representation of a display unit of a user device, indicating intensity of vibration of an adult toy, in accordance with an embodiment of the present disclosure.

At Step 314, the controller 114 displays a visual indication on the user device 108. The visual indication maybe indicative of intensity of vibration of the actuated adult toy 102. FIG. 5 illustrates an example representation 500 of a display unit of the user device 108, indicating intensity of vibration of the adult toy 102, in accordance with an embodiment of the present disclosure. As illustrated in FIG. 5, the visual indication may take several forms. In one form, the visual indication is in form of a dice 502, where the number (1 to 6) being displayed (for example, 4) is indicative of relative intensity of the vibration of the adult toy 102. In that regard, number 1 may indicate no vibration and number 6 may indicate maximum vibration intensity of the adult toy 102.

In another form, the visual indication is in form of bars 504 of varying sizes. In such a scenario, the number of bars being displayed corresponds to relative intensity of the vibration of the adult toy 102. For example, no bars being displayed may correspond to no vibration of the adult toy 102 and six bars may correspond to maximum vibration intensity of the adult toy 102. In yet another form, the visual indication is in form of bars 504 of varying sizes. In such a scenario, a fill percentage of an indicator bar 506 being displayed corresponds to relative intensity of the vibration of the adult toy 102. For example, no fill being displayed may correspond to no vibration of the adult toy 102 and the indicator bar 506 being completely filled may correspond to maximum vibration intensity of the adult toy 102. It is further to be noted that in several embodiments, the intensity of the actuation of the adult toy, on a successful match between the time-based metric and the one of the one or more preset parameters, at Step 306, is in correlation with the matched preset parameter. For example, the matched preset parameters may be preset instances of time at a start and an end of the input signal (I) 401 (for example, the starting (T1) and the ending (T2) time instances), a time interval (ΔT) of the input signal (I) 401, and the third time instance (T3)

Referring to FIGS. 3A-3B, at Step 316, the controller 114 receives a time instance reference value from the second user device 106B. Further, the controller 114 defines the time instance reference value as one of the one or more preset parameters. In that regard, the time-based metric is recorded as a time instance value of the tipping operation. Further, in that regard, the controller 114 actuates the adult toy 102 when the time instance value of the tipping operation equals the time instance reference value. In several embodiments of the invention, as will be presented in conjunction with FIGS. 6A-6B in the following discussion, at least one of the one or more preset parameters is a time instance within a time period of a cyclical event, assuming that time is reset at end of every cycle of the cyclical event.

Figure 6A:
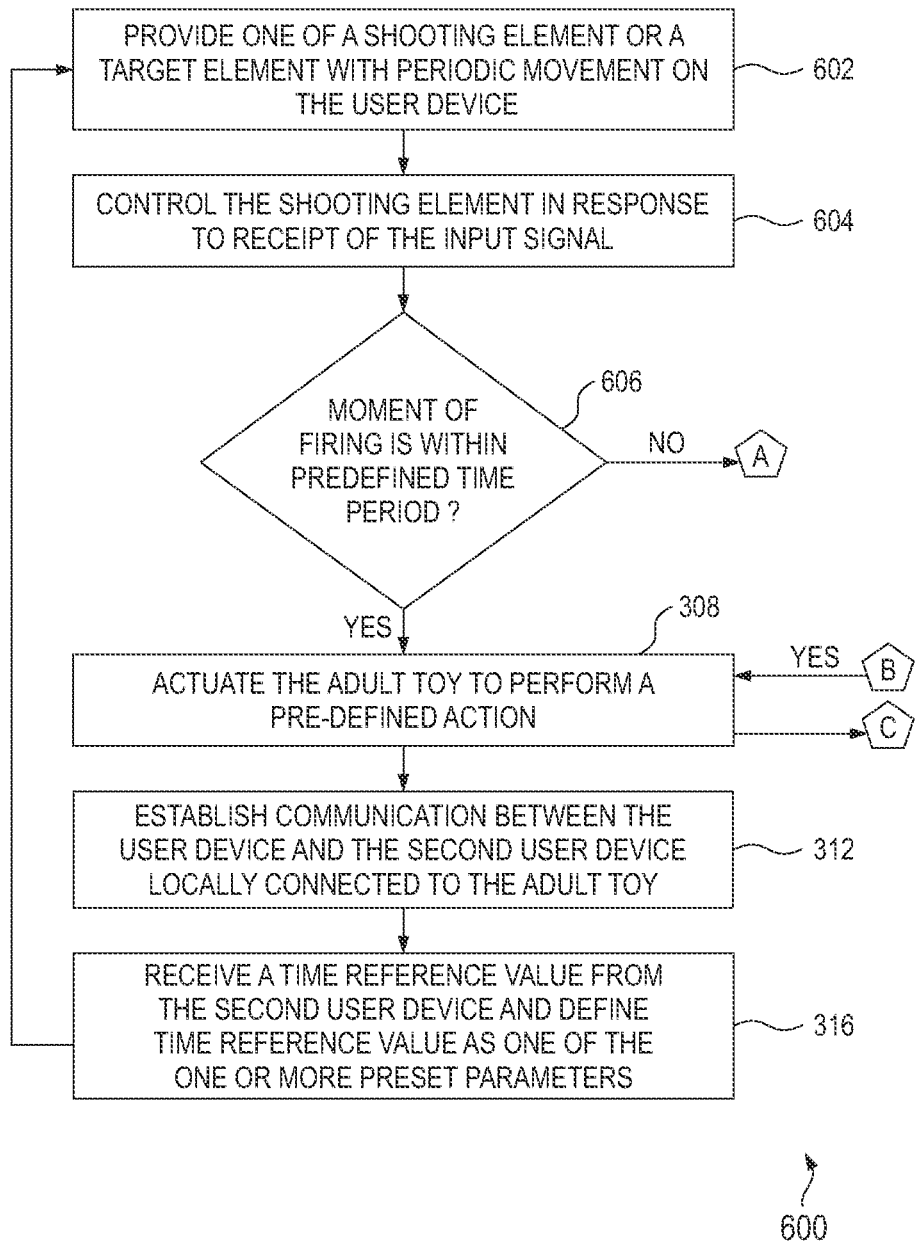
FIGS. 6A-6B illustrate a flow diagram illustrating a method for providing adult entertainment, in accordance with another embodiment of the present disclosure.
Figure 6B:
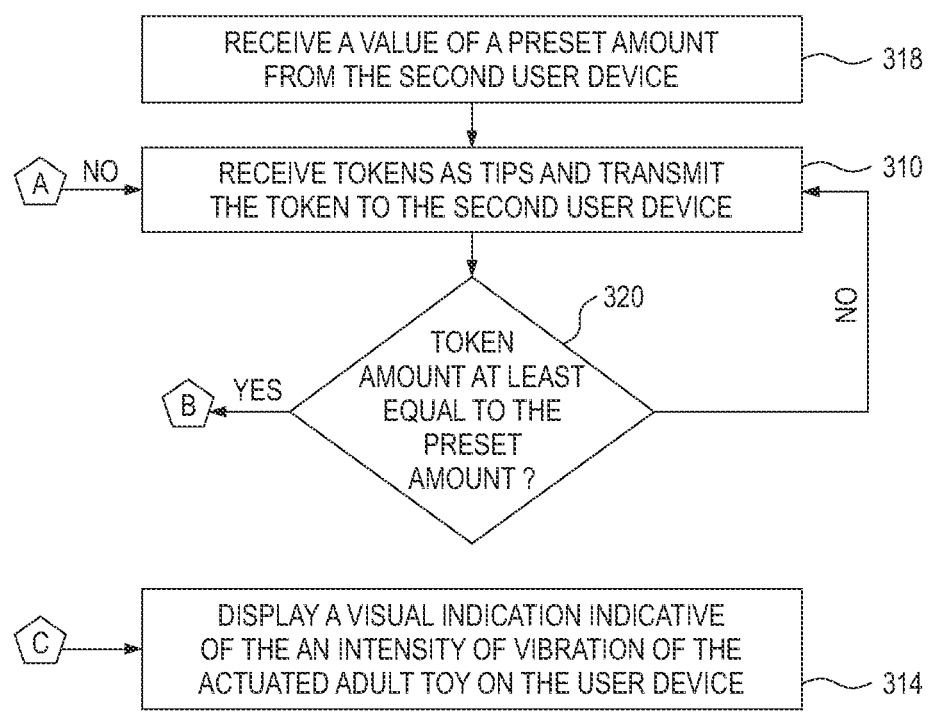
Figure 7:
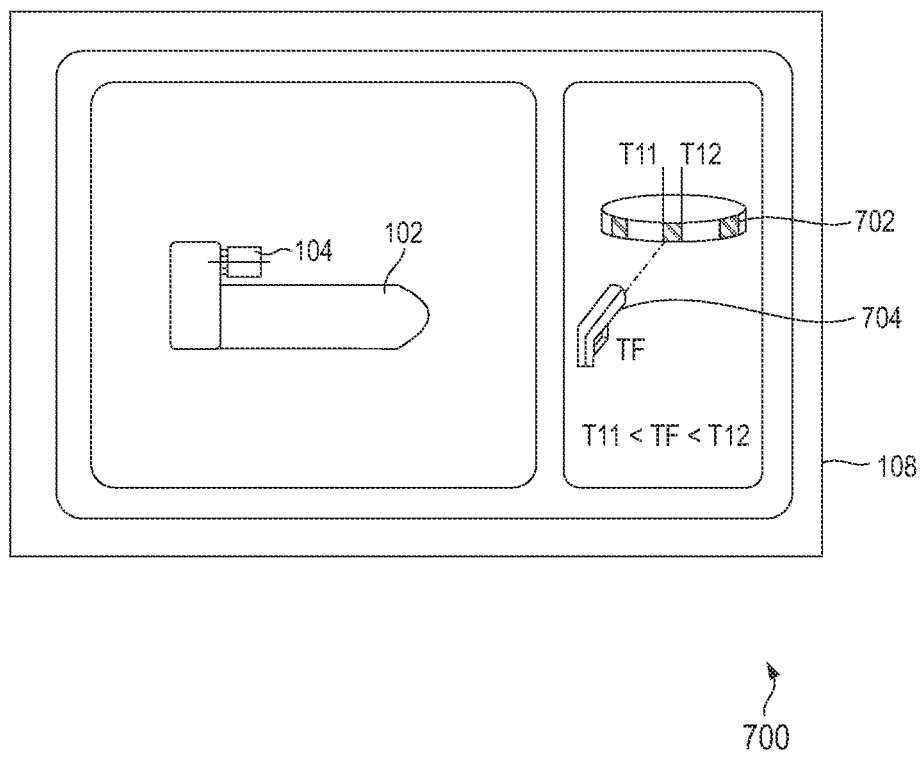
FIG. 7 illustrates an example representation of the display unit of the user device enabling the input signal to be received from a user interacting with a shooting game on the user device, in accordance with another embodiment of the present disclosure.

FIGS. 6A-6B illustrate a flow diagram illustrating a method 600 for providing adult entertainment, in accordance with another embodiment of the present disclosure. FIG. 7 illustrates an example representation 700 of the display unit of the user device 108 enabling the input signal (I) 401 to be received from a user interacting with a shooting game on the user device 108, in accordance with another embodiment of the present disclosure. The method 600 has been elucidated in conjunction with FIG. 7 for clarity of discussion.

The method 600 begins at Step 602. At Step 602, the controller 114 provides one of a shooting element 704 or a target element 702 with circular movement on a user interface of the user device 108. In several embodiments of the invention, the shooting element 704 may be stationary and the target element 702 may be moving circularly. In several alternate embodiments, the target element 702 may be stationary and the shooting element 704 may be moving circularly. In several other embodiments, both the target element 702 and the shooting element 704 may be moving circularly albeit in identical or non-identical paths of motion. In the embodiment illustrated through FIG. 7, the target element 702 has been illustrated as a rotating disc with target areas shaded on the lateral surface of the rotating disc, and the shooting element 704 has been depicted to emulate a gun.

At Step 604, the controller 114 controls the shooting element 704 in response to receipt of the input signal (I) 401 received from the user device 108. In that regard, on receipt of the input signal (I) 401, the controller 114 may modify the Graphic User Interface (GUI) of the display unit to create a perception of a bullet leaving the shooting element 704 and striking a certain area of the target element 702. The difficulty level of striking the certain area of the target element 702 may be inversely proportional to an amount of tipping tokens. For example, if the amount of tipping tokens is higher, the difficulty for the shooting element hit is lower, and vice versa. Herein, the difficulty level can be reduced by shortening the shooting range, increasing the volume of the target element, lowering the moving speed of the shooting element, etc. As a consequence, if the amount of tipping tokens is higher, more preset parameters of the input signal (I) 401 matches the time-based metric.

At Step 606, the controller 114 determines if a moment of firing ($T_F$) matches a time instance within a time period ($T_1$-$T_2$) that makes the shooting element 704 hit the target element 702. The determination of the moment of firing ($T_F$) matching a time instance within the time period ($T_1$-$T_2$) is considered equivalent to the time-based metric matching one of the one or more preset parameters by the controller 114. If the aforementioned condition is satisfied, i.e., the moment of firing ($T_F$) matches a time instance within the time period ($T_1$-$T_2$), or ($T_1$<$T_F$<$T_2$), the method 600 moves to Step 308 of the method 300. As a result, the controller 114 actuates the adult toy 102 to perform the pre-defined function. Alternately, the method 600 proceeds to Step 310 of the method 300 where the controller 114 receives tokens as tips from the user device 108 and transmits the tokens to the second user device 106B. Step 318 precedes Step 320. The method 600 then follows the same method steps, viz. Step 320. Following Step 320, the method 600 returns to Step 308. Following Step 308, the method 800 moves to Step 312 and Step 314. Following Step 312, the method 600 moves to Step 316. Steps 312, 314, 316, 318, and 320 are performed in the same manner as they have been discussed in regards to method 300 and FIGS. 3, 4A, 4B, and 4C.

In several embodiments of the invention, as will be presented in conjunction with FIGS. 8A-8B in the following discussion, the one or more preset parameters are one or more preset beats in a section of music.

Figure 8A:
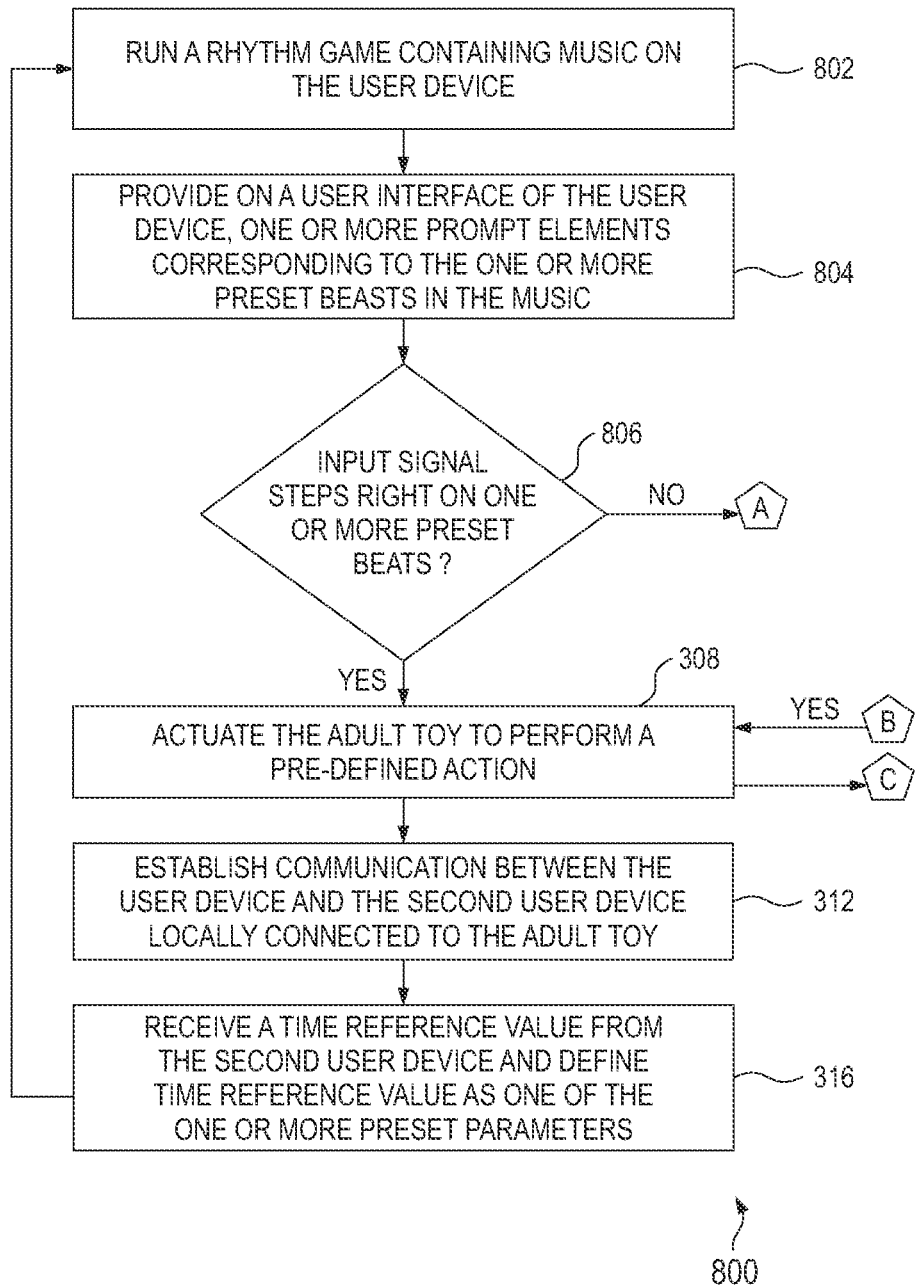
FIGS. 8A-8B illustrate a flow diagram illustrating a method for providing adult entertainment, in accordance with another embodiment of the present disclosure.
Figure 8B:
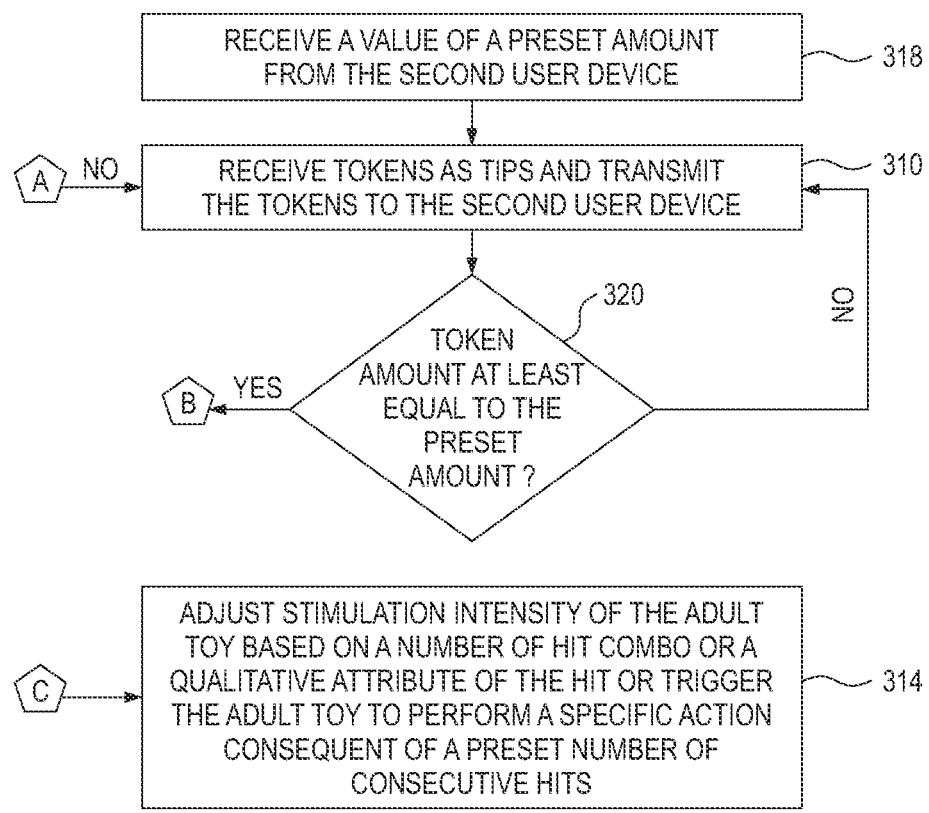
Figure 9:
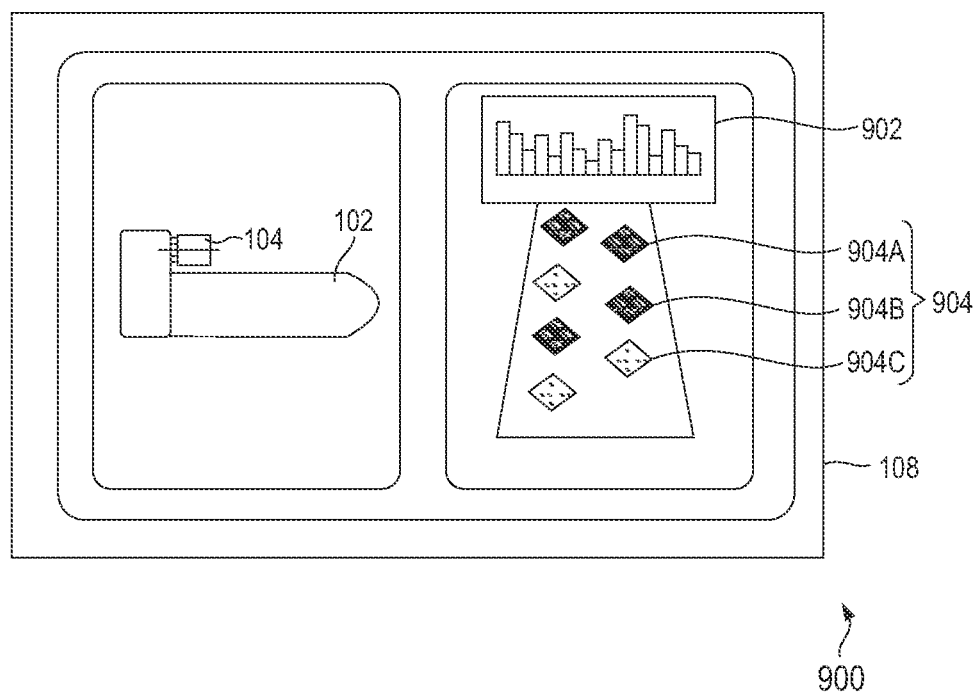
FIG. 9 illustrates an example representation of the display unit of the user device enabling the input signal to be received from a user interacting with a rhythm game on the user device, in accordance with another embodiment of the present disclosure.

FIGS. 8A-8B illustrate a flow diagram illustrating a method 800 for providing adult entertainment, in accordance with another embodiment of the present disclosure. FIG. 9 illustrates an example representation 900 of the display unit of the user device 108 enabling the input signal (I) 401 to be received from a user interacting with a rhythm game 902 on the user device 108, in accordance with another embodiment of the present disclosure. The method 800 has been elucidated in conjunction with FIG. 9 for clarity of discussion.

The method 800 begins at Step 802, the controller 114 runs the rhythm game 902 containing the music on the user device 108. The music is envisaged to include the one or more beats. Furthermore, the music-play is graphically illustrated on a screen in the form of a graphic equalizer as illustrated in FIG. 9.

At Step 804, the controller 114 provides one or more prompt elements 904 (for example, 904a, 904b, 904c) corresponding to the one or more preset beats in the music on a user interface of the user device 108. In that regard, the controller 114 may modify the GUI of the display unit to create a perception of rapid appearance and disappearance of the one or more prompt elements 904, individually or in combinations of two or more. The one or more prompt elements 904 correspond to illuminated or flashing areas, or areas giving distinct visual representations, and the user is expected to provide the input signal (I) 401 on a currently visible prompt element (for example, 904a) by clicking on the prompt element using a mouse or a touchpad or a touchscreen, or by specific keystrokes on a keyboard, or through any other form of gestural input medium. If the user can click or keystroke on the displayed prompt element 904a before the prompt element disappears from the GUI, then the controller 114 would consider that the input signal (I) 401 steps right on the one or more preset beats.

At Step 806, the controller 114 determines if the input signal (I) 401 steps right (or in a correct manner) on one or more preset beats. The determination of the input signal (I) 401 stepping right on the one or more preset beats is considered equivalent to the time-based metric matching one of the one or more preset parameters by the controller 114. If the aforementioned condition is satisfied, i.e., the input signal (I) 401 steps right on the one or more preset beats, the method 800 moves to Step 308 of the method 300. As a result, the controller 114 actuates the adult toy 102 to perform the pre-defined function. Alternately, the method 800 proceeds to Step 310 of the method 300 where the controller 114 receives tokens as tips from the user device 108 and transmits the tokens to the second user device 106B. Step 318 precedes Step 310, and Step 320 follows Step 310. Following Step 320, the method 800 returns to Step 308. Following Step 308, the method 800 moves to Step 312 and Step 808. Step 312 is then followed by Step 316. Steps 312 and 316 are performed in the same manner as they have been discussed in regards to method 300 and FIGS. 3, 4A, 4B, and 4C.

However, at Step 808, the controller 114 may increase stimulation intensity of the adult toy 102 based on an increasing number of hit combos. The hit combo is envisaged to be an indicator of the accuracy of steps on the one or more preset beats. Alternately, at Step 808, the controller 114 may adjust the stimulation intensity of the adult toy 102 based on a qualitative attribute of steps on the one or more prompt elements for the time-based metric with respect to the preset beats. In that regard, the steps on the one or more prompt elements may be categorized as 'GOOD', 'BETTER', 'BEST', and 'MISS', where 'GOOD' categorization may refer to maximum vibration intensity and 'MISS' categorization may refer to an absence of the vibration. Alternately, at Step 808, the controller 114 may trigger the adult toy 102 to perform a specific action when satisfying a preset number of consecutive right steps on the one or more prompt elements. It should be noted that the predefined action and the specific action of the adult toy 102 may be different from each other. In one example, the predefined action may provide a low-intensity vibration of the adult toy 102 and the special action may provide a high-intensity vibration of the adult toy 102. In another example, the predefined action may not facilitate a thrusting effect and the special action may facilitate the thrusting effect. Also, the special action may be facilitated with a control pattern which may not be facilitated in the predefined action.

Figure 10A:
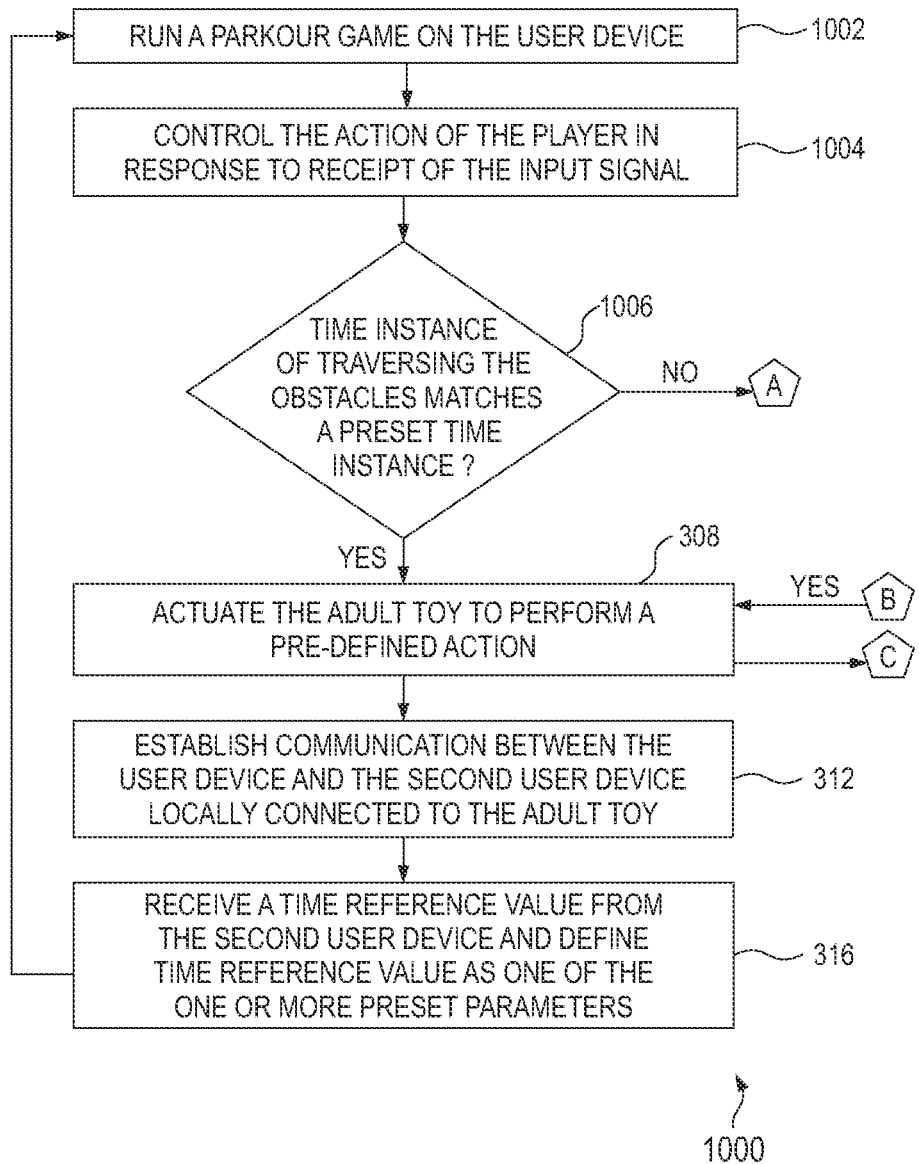
FIGS. 10A-10B illustrate a flow diagram illustrating a method for providing adult entertainment, in accordance with another embodiment of the present disclosure.
Figure 10B:
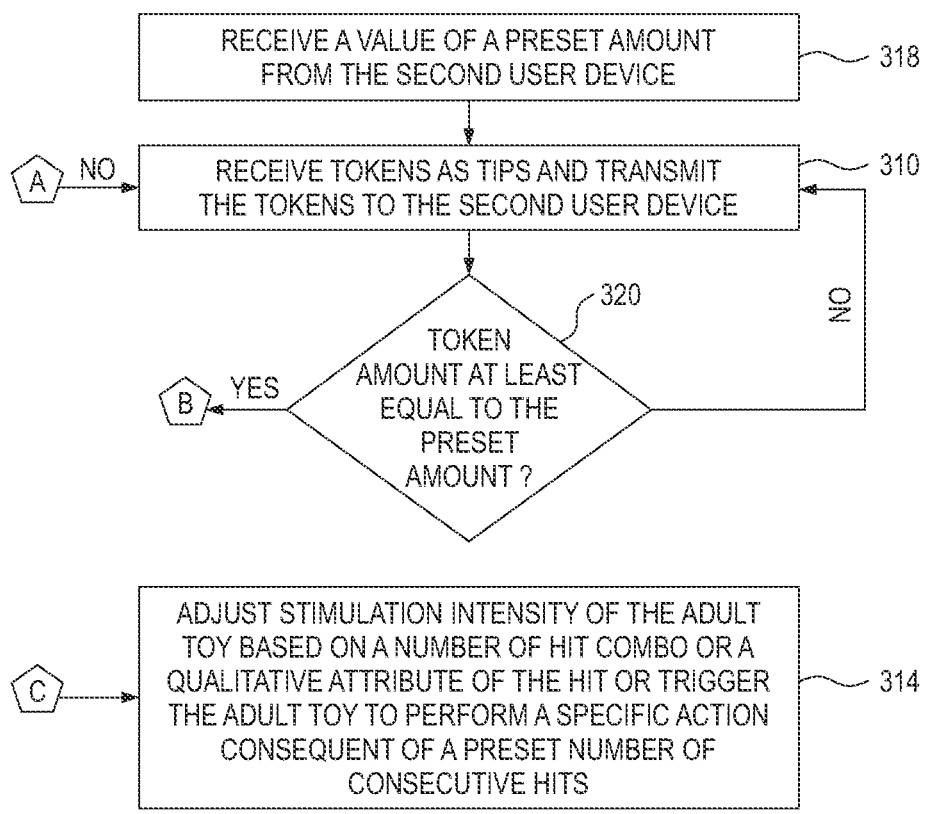
Figure 11:
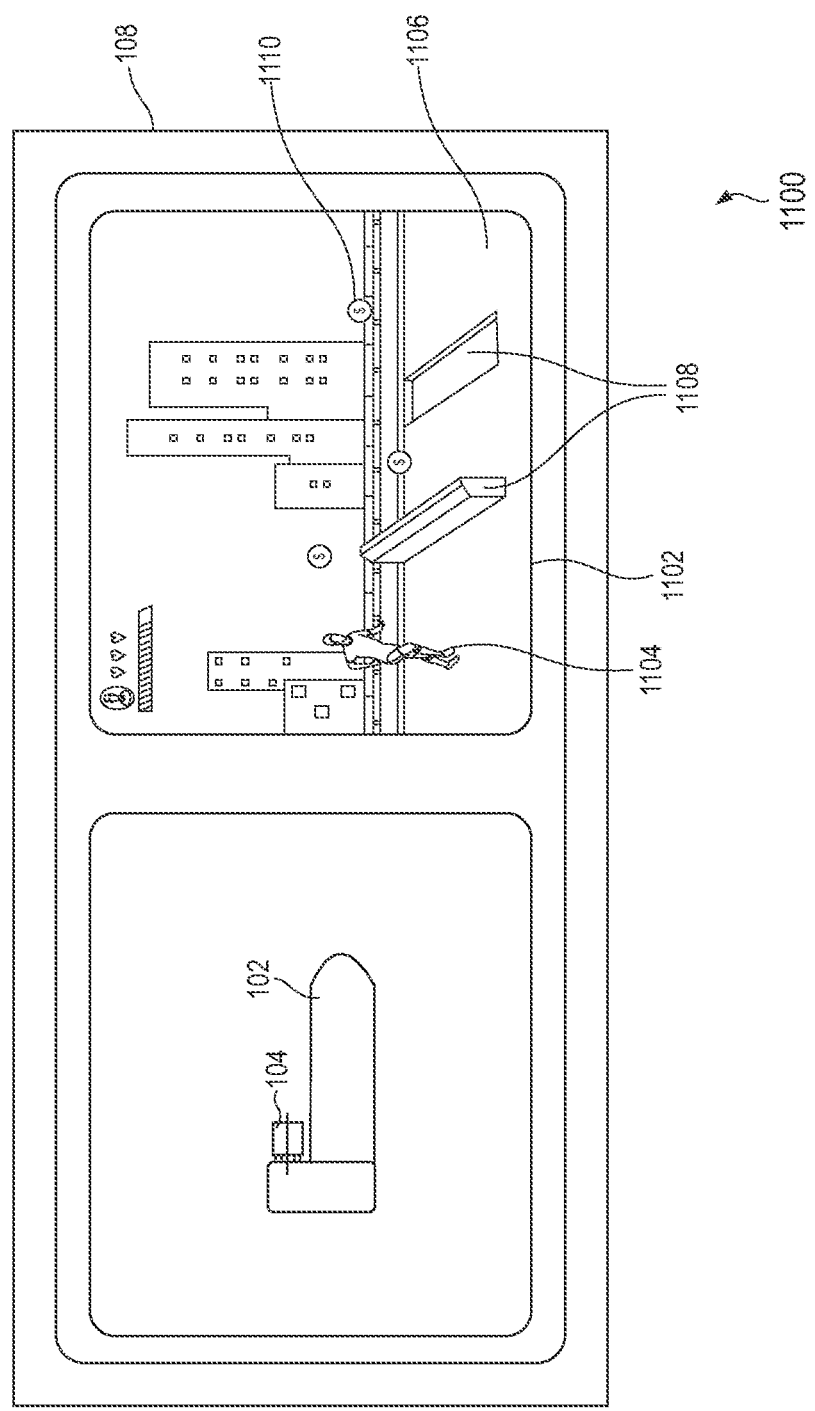
FIG. 11 illustrates an example representation of the display unit of the user device enabling the input signal to be received from the user interacting with a parkour game on the user device, in accordance with another embodiment of the present disclosure.

FIGS. 10A-10B illustrate a flow diagram illustrating a method 1000 for providing adult entertainment, in accordance with yet another embodiment of the present disclosure. FIG. 11 illustrates an example representation 1100 of the display unit of the user device 108 enabling the input signal (I) 401 to be received from the user interacting with a parkour game 1102 on the user device 108, in accordance with another embodiment of the present disclosure. The method 1000 has been elucidated in conjunction with FIG. 11 for clarity of discussion.

The method 1000 begins at Step 1002, the controller 114 runs the parkour game 1102 on the user device 108. The parkour game 1102 includes at least a player 1104 running on a natural or artificially created road 1106, and traversing obstacles 1108 on the road 1106. The player 1104 traverses obstacles 1106 through one or more actions such as running, vaulting, jumping, climbing, rolling, etc. to travel from one location to another location of the road 1106 in a quickest and most efficient way without using any accessories. In the embodiment illustrated through FIG. 11, the user controls the jumping actions of the player 1104 while traversing the obstacles 1106 on the road 1106, through the user device 108.

At Step 1004, the controller 114 controls the action of the player 1104 in response to receipt of the input signal (I) 401 received from the user device 108. In that regard, on receipt of the input signal (I) 401, the controller 114 may modify the Graphic User Interface (GUI) of the display unit to create a perception of the player 1104 traversing the obstacles 1108 at accurate timing. Based on the traversing action of the player 1104 corresponding to the obstacles 1108 illuminated on the road 1106, the user is expected to provide the input signal (I) 401 by pressing a button of the user device 108. In one example, the user may press the button of the user device 108 such as a mouse or a touchpad or a touchscreen, or by specific keystrokes on a keyboard, or through any other form of gestural input medium for traversing the obstacles 1108 and collecting one or gems 1110. In another example, the user may provide the input signal (I) 401 by squeezing the adult toy 102 to perform actions required for traversing the obstacles 1108 by the player 1104.

At Step 1006, the controller 114 determines if a time instance of traversing the obstacles 1108 matches a preset time defined by the controller 114. If the aforementioned condition is satisfied, i.e., traversing the obstacles 1108 by the player 1104, the method 1100 moves to Step 308 of the method 300. As a result, the controller 114 actuates the adult toy 102 to perform the pre-defined function. Alternately, the method 1100 proceeds to Step 310 of the method 300 where the controller 114 receives tokens as tips from the user device 108 and transmits the tokens to the second user device 106B. Step 318 precedes Step 310. Following Step 310, the method 800 then moves to 320. Following Step 320, the method 800 returns to Step 308. Following Step 308, the method 800 moves to Step 312 and Step 808. Step 312 is followed by the Step 316. Steps 312 and 316 are performed in the same manner as they have been discussed in regards to method 300 and FIGS. 3, 4A, 4B, and 4C.

However, at Step 808, the controller 114 may increase stimulation intensity of the adult toy 102 based on an increasing number of hit combos. The hit combo is envisaged to be an indicator of the accuracy of steps on the one or more preset beats. Alternately, at Step 808, the controller 114 may adjust the stimulation intensity of the adult toy 102 based on a qualitative attribute of steps on the one or more prompt elements for the time-based metric with respect to the preset beats. In that regard, the steps on the one or more prompt elements may be categorized as 'GOOD', 'BETTER', 'BEST', and 'MISS', where 'GOOD' categorization may refer to maximum vibration intensity and 'MISS' categorization may refer to an absence of the vibration. Alternately, at Step 808, the controller 114 may trigger the adult toy 102 to perform a specific action when satisfying a preset number of consecutive right steps on the one or more prompt elements. It should be noted that the predefined action and the specific action of the adult toy 102 may be different from each other. In one example, the predefined action may provide a low-intensity vibration of the adult toy 102 and the special action may provide a high-intensity vibration of the adult toy 102. In another example, the predefined action may not facilitate a thrusting effect and the special action may facilitate the thrusting effect. Also, the special action may be facilitated with a control pattern which may not be facilitated in the predefined action.

Various embodiments of the disclosure, as discussed above, may be practiced with steps and/or operations in a different order, and/or with hardware elements in configurations, which are different from those which are disclosed. Therefore, although the disclosure has been described based on these exemplary embodiments, it is noted that certain modifications, variations, and alternative constructions may be apparent and well within the scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A method for providing adult entertainment, comprising:
predefining, by a controller, one or more preset parameters corresponding to at least one predefined action of an adult toy;
recording, by the controller, a time-based metric for an input signal received from a user device;
determining, by the controller, if the time-based metric matches one of the one or more preset parameters; and
actuating, by the controller, on a successful match between the recorded time-based metric and the one of the predefined one or more preset parameters, the adult toy to perform a pre-defined action of the at least one predefined action, corresponding to the matched preset parameter to sexually stimulate a user of the adult toy.

2. The method as claimed in claim 1, wherein the time-based metric is selected from preset instances of time at a start and an end of the input signal, a time interval of the input signal, and a preset time instance during the time interval.

3. The method as claimed in claim 1, further comprising establishing, by the controller, communication between the user device and a second user device locally connected to the adult toy, wherein the user device is configured to receive video streaming from the second user device, and the input signal corresponds to a tipping operation sent from the user device to the second user device.

4. The method as claimed in claim 2, further comprising:
receiving, by the controller, a time instance reference value from the second user device, and the time instance reference value defined, by the controller, as one of the one or more preset parameters,
wherein the time-based metric is recorded as a time instance value of the tipping operation.

5. The method as claimed in claim 2, further comprising:
receiving, by the controller, on an unsuccessful match between the time-based metric and the one of the one or more preset parameters, tokens as tips from the user device; and
transmitting, by the controller, the tokens to the second user device.

6. The method as claimed in claim 1, further comprising displaying, by the controller, a visual indication on the user device, the visual indication indicative of intensity of vibration of the actuated adult toy,
wherein the intensity of the actuation of the adult toy, on a successful match between the time-based metric and the one of the one or more preset parameters, is in correlation with the matched preset parameter.

7. The method as claimed in claim 2, wherein the time-based metric is a predefined field of a Unix timestamp of the input signal.

8. The method as claimed in claim 1, wherein at least one of the one or more preset parameters is a time instance within a time period of a cyclical event.

9. The method as claimed in claim 8, further comprising:
providing, by the controller, one of a shooting element or a target element with circular movement on a user interface of the user device;
controlling, by the controller, the shooting element to fire in response to receipt of the input signal,
wherein determining if the time-based metric matches one of the one or more preset parameters comprises determining, by the controller, whether a moment of firing matches a time instance within a time period that makes the shooting element hit the target element.

10. The method as claimed in claim 9, wherein if the amount of tipping tokens is higher, the difficulty for the shooting element hit is lower.

11. The method as claimed in claim 1, wherein the one or more preset parameters are one or more preset beats in a section of music.

12. The method as claimed in claim 11, further comprising:
running, by the controller, a rhythm game containing the music on the user device;
providing, by the controller, on a user interface of the user device, one or more prompt elements corresponding to the one or more preset beats in the music,
wherein determining if the time-based metric matches the one of the one or more preset parameters comprises determining whether the input signal steps right on the one or more preset beats.

13. The method as claimed in claim 12, further comprising at least one of:
increasing, by the controller, stimulation intensity of the adult toy based on an increasing number of hit combo, the hit combo indicative of accuracy of steps on the one or more preset beats;
adjusting, by the controller, the stimulation intensity of the adult toy based on a qualitative attribute of steps on the one or more prompt elements for the time-based metric with respect to the preset beats; and
triggering, by the controller, the adult toy to perform a specific action when satisfying a preset number of consecutive right steps on the one or more prompt elements.

14. The method as claimed in claim 3, wherein the input signal is received in response to confirmation of an amount transferred from the user device to the second user device during the tipping operation, is at least equal to a preset amount defined through the second user device.

15. The method of claim 14, further comprising:
returning, by the controller, to the first user device upon performing the pre-defined action by the adult toy, a deducted portion that is equal to the preset amount from the amount being transferred.

16. A system for providing adult entertainment, comprising:
a controller comprising:
a memory unit comprising machine-readable instructions; and
a processor operably connected to the memory unit, the processor configured to execute the machine-readable instructions, the machine-readable instructions when executed enable the controller to:
predefine one or more preset parameters corresponding to at least one predefined action of an adult toy;
record a time-based metric for an input signal received from a user device;
determine if the time-based metric matches one of the one or more preset parameters; and
actuate, on a successful match between the recorded time-based metric and the one of the predefined one or more preset parameters, the adult toy to perform a pre-defined action of the at least one predefined action, corresponding to the matched preset parameter to sexually stimulate a user of the adult toy.

17. The system as claimed in claim 16, wherein the controller is further enabled to establish communication between the user device and a second user device locally connected to the adult toy, wherein the user device is configured to receive video streaming from the second user device, and the input signal corresponds to a tipping operation sent from the user device to the second user device.

18. The system as claimed in claim 17, wherein the controller is further enabled to:
receive a time instance reference value from the second user device, and the time instance reference value defined, by the controller, as one of the one or more preset parameters,
wherein the time-based metric is recorded as a time instance value of the tipping operation.

19. The system as claimed in claim 17, wherein the controller is further enabled to:
receive, on an unsuccessful match between the time-based metric and the one of the one or more preset parameters, tokens as tips from the user device; and
transmit the tokens to the second user device.

20. A non-transitory computer-readable storage medium, comprising:
machine-readable instructions,
the machine-readable instructions when executed by a processor of a controller, enable the controller to:
predefine one or more preset parameters corresponding to at least one predefined action of an adult toy;
record a time-based metric for an input signal received from a user device;
determine if the time-based metric matches one of the one or more preset parameters; and
actuate, on a successful match between the recorded time-based metric and the one of the predefined one or more preset parameters, the adult toy to perform a pre-defined action of the at least one predefined action,
corresponding to the matched preset parameter to sexually stimulate a user of the adult toy.

* * * * *